US009992325B2

(12) United States Patent
Watanabe et al.

(10) Patent No.: US 9,992,325 B2
(45) Date of Patent: Jun. 5, 2018

(54) MOBILE ELECTRONIC DEVICE, CONTROL METHOD, AND COMPUTER PROGRAM

(71) Applicant: KYOCERA Corporation, Kyoto-shi, Kyoto (JP)

(72) Inventors: Kouji Watanabe, Yokohama (JP); Saya Miura, Yokohama (JP); Shinya Mizuno, Machida (JP)

(73) Assignee: KYOCERA CORPORATION, Kyoto (JP)

( * ) Notice: Subject to any disclaimer, the term of this patent is extended or adjusted under 35 U.S.C. 154(b) by 0 days. days.

(21) Appl. No.: 15/306,473

(22) PCT Filed: Apr. 24, 2015

(86) PCT No.: PCT/JP2015/062615
§ 371 (c)(1),
(2) Date: Oct. 24, 2016

(87) PCT Pub. No.: WO2015/163475
PCT Pub. Date: Oct. 29, 2015

(65) Prior Publication Data
US 2017/0048382 A1 Feb. 16, 2017

(30) Foreign Application Priority Data
Apr. 25, 2014 (JP) .................................. 2014-091731

(51) Int. Cl.
*H04M 1/72* (2006.01)
*H04M 1/00* (2006.01)
(Continued)

(52) U.S. Cl.
CPC ......... *H04M 1/72569* (2013.01); *H04M 1/00* (2013.01); *H04M 19/04* (2013.01); *H04M 19/047* (2013.01); *H04M 19/048* (2013.01)

(58) Field of Classification Search
CPC .. H04M 1/72569; H04M 19/047; H04M 1/00; H04M 19/04; H04M 19/048; H04M 1/725
See application file for complete search history.

(56) References Cited

U.S. PATENT DOCUMENTS 8,019,377 B2 * 9/2011 Watanabe ........... H04L 12/6418
455/550.1
8,145,192 B2 * 3/2012 Tanae .................... H04M 19/04
455/41.2
(Continued)

FOREIGN PATENT DOCUMENTS

JP 2009-206868 A 9/2009
JP 2009-225208 A 10/2009
(Continued)

OTHER PUBLICATIONS

International Search Report in PCT/JP2015/062615, dated Jul. 14, 2015.

*Primary Examiner* — Pablo Tran
(74) *Attorney, Agent, or Firm* — Hauptman Ham, LLP

(57) ABSTRACT

A mobile electronic device according to an embodiment includes an annunciator that performs notification about an event, and a controller that causes the annunciator to perform the notification about the event when a lifting operation that lifts the mobile electronic device has been detected. A mobile electronic device includes an annunciator performing notification about an event, and a controller causing the annunciator to perform the notification about the event when it is detected that the mobile electronic device has made a transition to a handheld state.

12 Claims, 4 Drawing Sheets

(51) Int. Cl.
*H04M 19/04* (2006.01)
*H04M 1/725* (2006.01)

(56) References Cited

U.S. PATENT DOCUMENTS

| | | | | |
|---|---|---|---|---|
| 2001/0007817 A1* | 7/2001 | Odagiri | ................ | H04B 1/385 |
| | | | | 455/421 |
| 2002/0115478 A1* | 8/2002 | Fujisawa | ............. | H04M 1/6505 |
| | | | | 455/567 |
| 2007/0037605 A1* | 2/2007 | Logan | ................ | G08B 13/1427 |
| | | | | 455/567 |

FOREIGN PATENT DOCUMENTS

| JP | 2009-290306 A | | 12/2009 |
|---|---|---|---|
| JP | 2013070416 A | * | 4/2013 |
| JP | 2015073303 A | * | 4/2015 |

\* cited by examiner

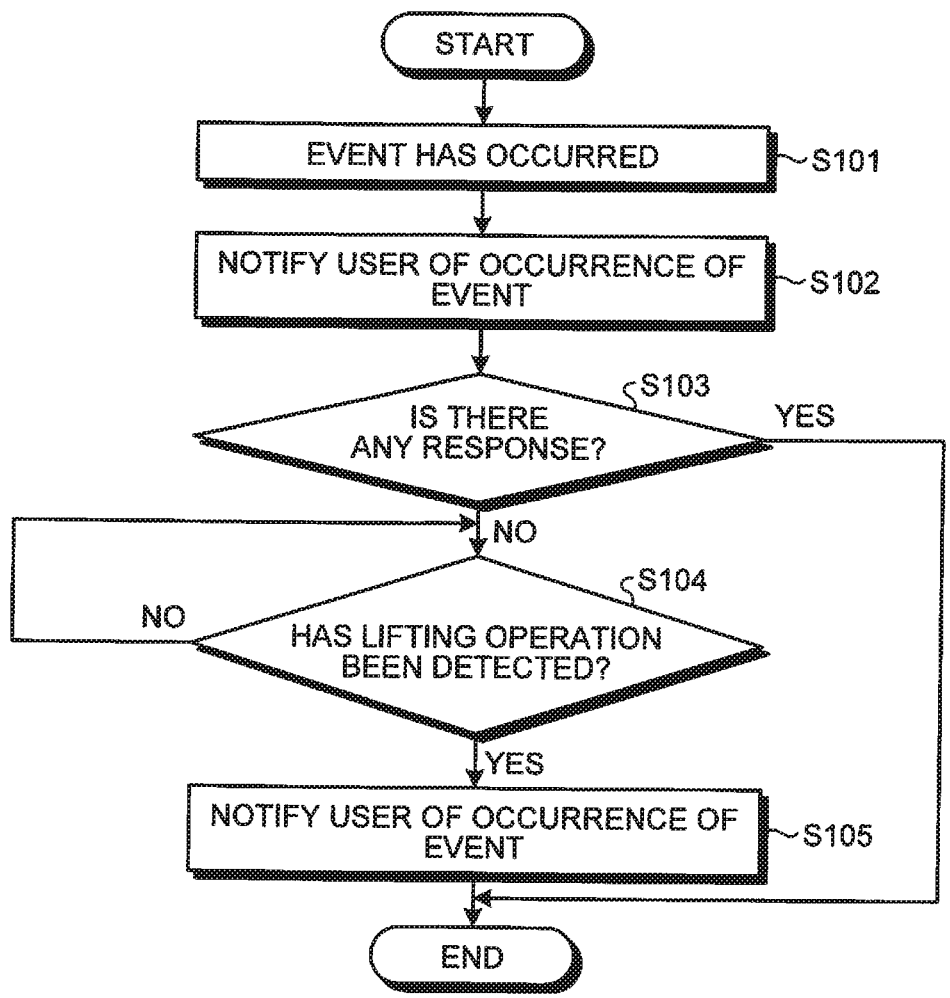

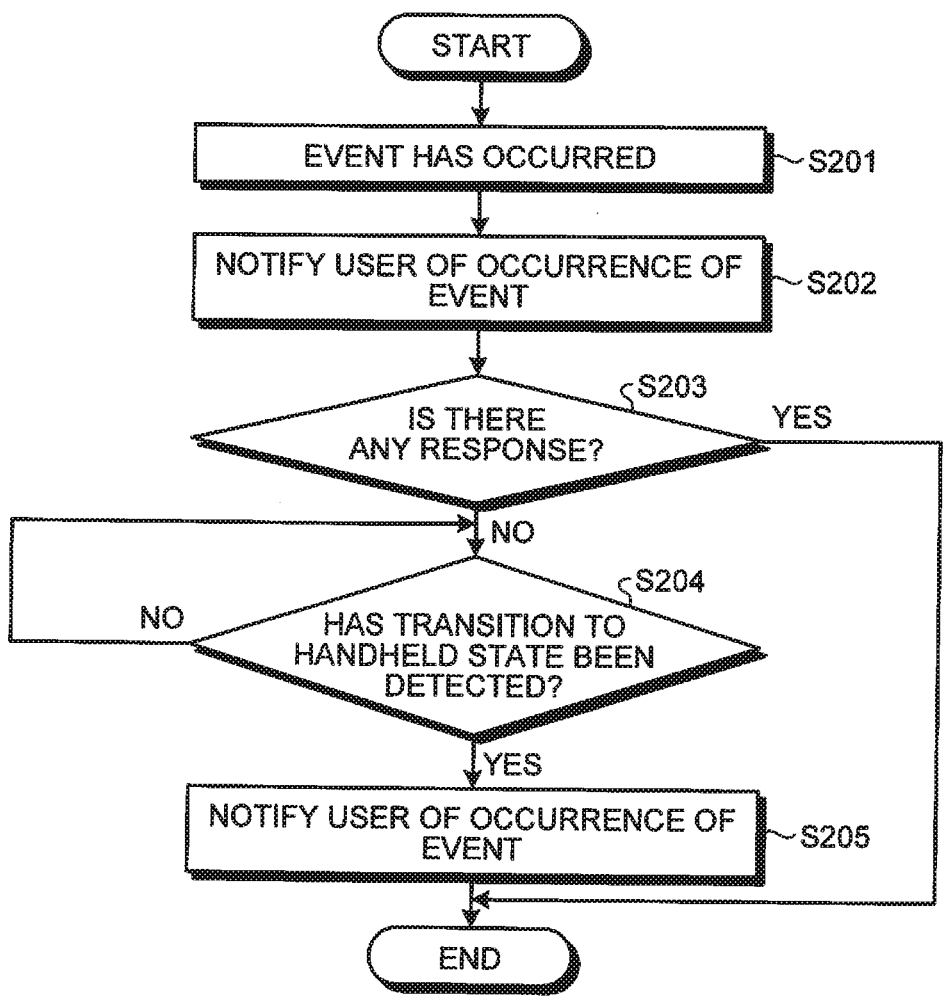

MOBILE ELECTRONIC DEVICE, CONTROL METHOD, AND COMPUTER PROGRAM

CROSS-REFERENCE TO RELATED APPLICATION

The present application is a National Phase entry of International Application No. PCT/JP2015/062615, filed Apr. 24, 2015, which claims priority of Japanese Application No. 2014-091731, filed Apr. 25, 2014.

FIELD

The present application relates to a mobile electronic device, a control method, and a computer program.

BACKGROUND

General electronic devices have a notification function that notifies a user of events such as an arrival. The electronic device, even if a user is in motion when an arrival is detected, appropriately controls its arrival notification.

SUMMARY

In one aspect, a mobile electronic device, includes:
an annunciator performing notification about an event; and
a controller causing the annunciator to perform the notification about the event when a lifting operation that lifts the mobile electronic device has been detected.

In one aspect, a mobile electronic device includes:
an annunciator performing notification about an event; and
a controller causing the annunciator to perform the notification about the event when it is detected that the mobile electronic device has made a transition to a handheld state.

In one aspect, a control method for a mobile electronic device includes the steps of:
determining a state of the mobile electronic device; and
performing notification about an event when a lifting operation that lifts the mobile electronic device has been detected.

In one aspect, a computer program that causes a mobile electronic device to execute the steps of:
determining a state of the mobile electronic device; and
performing notification about an event when a lifting operation that lifts the mobile electronic device has been detected.

BRIEF DESCRIPTION OF THE DRAWINGS

FIG. 3 is a flowchart of an example of an operation about the notification function.
FIG. 4 is a flowchart of another example of the operation about the notification function.

DETAILED DESCRIPTION

The conventional electronic device has room for improvement in control about event notification.

The following describes an example of embodiments of a mobile electronic device in detail with reference to the accompanying drawings. Examples of the mobile electronic device include, but are not limited to, smartphones, mobile phones, tablets, mobile personal computers, digital cameras, media players, electronic book readers, navigators, game machines, etc.

Figure 1:
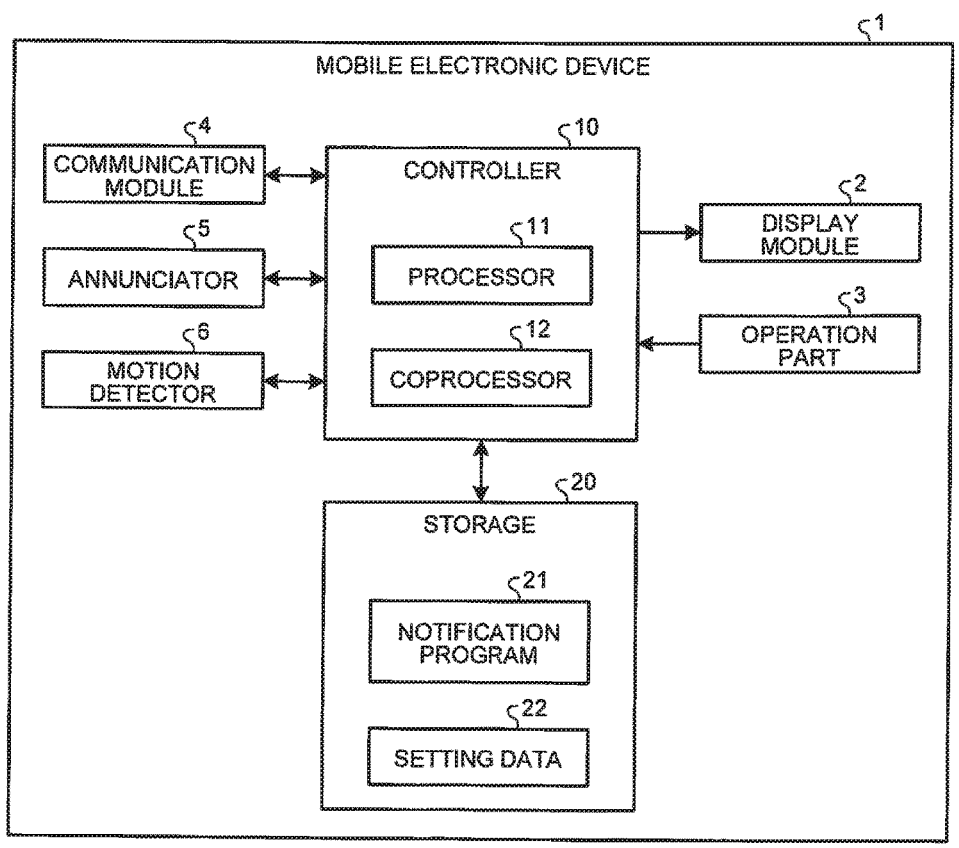
FIG. 1 is a block diagram of a mobile electronic device.

FIG. 1 is a block diagram of a mobile electronic device 1 according to the example of embodiments. The mobile electronic device 1 includes a display module 2, an operation part 3, a communication module 4, an annunciator 5, a motion detector 6, a controller 10, and a storage 20.

The display module 2 includes a display device such as a liquid crystal display, an organic electro-luminescence display, or an inorganic electro-luminescence display. The display module 2 displays a screen containing letters, images, symbols, figures, and the like using the display device.

The operation part 3 receives operations by a user. The operation part 3 includes buttons, keyboards, dials, levers, and touch screens (touch sensors), for example. The operation part 3 may receive operations in a noncontact manner such as sound or light. The operation part 3 may support a plurality of operation manners.

The whole or part of the operation part 3 may be integral with the display module 2. In the mobile electronic device 1, a touch screen that detects contact as the operation part 3 may be provided integrally with the display module 2, for example. The mobile electronic device 1 provided with the touch screen as the operation part 3 can detect gestures performed on the display module 2 by the user using a finger or the like via the touch screen.

The communication module 4 enables wireless data communication. The communication module 4 supports either or both of wireless communication in a relatively wide area such as 3G or 4G that communication carriers provide and wireless communication in a relatively short range such as WiFi (registered trademark) or Bluetooth (registered trademark). The communication module 4 may support voice communication.

The annunciator 5 performs notification for notifying a user of the fact that an event has occurred. The annunciator 5 performs notification using sound, vibration, light, or the like. Examples of the event notified by the annunciator 5 include, but are not limited to, the arrival of a telephone call (a voice arrival), the arrival of a message such as an e-mail, the arrival of the starting time of a registered schedule, the arrival of a registered rising time, the notification of the update of an application, etc.

The motion detector 6 detects the motion of the mobile electronic device 1 in a three-dimensional space. The motion detector 6 can detect changes in the position of the mobile electronic device 1 and changes in the attitude of the mobile electronic device 1, for example. The motion detector 6 can include various sensors such as an acceleration sensor, a gyroscope, an orientation sensor, and an atmospheric pressure sensor in order to detect the motion of the mobile electronic device 1. The mobile electronic device 1 acquires the frequency, the amplitude, and the like of the vibrations of the mobile electronic device 1 caused by external forces, for example, using the motion detector 6.

The controller 10 controls the mobile electronic device 1. The controller 10 includes a processor 11 and a coprocessor 12. The processor 11 and the coprocessor 12 are processing units. Examples of the processing units include, but are not limited to, central processing units (CPUs), system-on-a-chip (SoC), micro control units (MCUs), field-programmable gate arrays (FPGAs), etc.

The processor 11 executes various kinds of computer programs stored in the storage 20, thereby implementing the various kinds of functions of the mobile electronic device 1. Specifically, the processor 11 refers to data and the results of processing acquired from the modules of the mobile electronic device 1. The processor 11 executes instructions contained in the computer programs, thereby executing various kinds of control.

The coprocessor 12 can operate as usual even when the processor 11 stops or reduces its processing speed in order to reduce power consumption. Owing to the property suitable to thus operate continuously, the coprocessor 12 can be used for the acquisition and analysis of the detection values of the various kinds of sensors, the execution of processing corresponding to analysis results, or the like, for example.

The storage 20 stores therein computer programs and data. The storage 20 can be used as a work area that temporarily stores therein the processing results of the controller 10. The storage 20 may include a semiconductor storage medium and any non-transitory storage medium such as a magnetic storage medium. The storage 20 may include a plurality of kinds of storage media. The storage 20 may include a combination of a portable storage medium such as a memory card, an optical disc, or a magneto-optical disc and a reading device for the storage medium. The storage 20 may include a storage device used as a temporary storage area such as a random access memory (RAM).

The storage 20 stores therein a notification program 21 and setting data 22, for example. The notification program 21 provides a notification function that notifies the user using the annunciator 5. The notification through the notification function is performed when an event to be notified occurs. The notification function that the notification program 21 provides further includes a renotification function that renotifies the user of an unconfirmed event. The unconfirmed event is an event for which a response operation for the user to confirm the contents of the event is not detected even though the event has been notified.

The unconfirmed event includes the arrival of a telephone call as an unattended arrival and the arrival of an e-mail as an unconfirmed e-mail, for example.

The mobile electronic device 1 detects that the state of the device has made a transition to a state of being held by the hand of the user in the renotification function. When there is any unconfirmed event when detecting the transition to the state of being held by the hand of the user, the mobile electronic device 1 renotifies the user of the unconfirmed event. The user of the mobile electronic device 1 having the renotification function easily notices the notified event and easily responds to the event.

The manner of the notification through the renotification function may be different from the manner of notification when an event occurs. The manner of the notification through the renotification function is preferably a manner that can be sensed by the hand of the user who is holding the mobile electronic device 1. Examples of the manner that can be sensed by the hand of the user include notification through vibration. The manner of the notification through the renotification function may be notification through sound.

The setting data 22 stores therein various kinds of information for determining the operation of the mobile electronic device 1. The information stored in the setting data 22 includes information on the unconfirmed event and the fluctuation pattern data of acceleration for detecting that the state of the mobile electronic device 1 has made a transition to the state of being held by the hand of the user, for example.

The setting data 22 can be acquired from another device via communication by the communication module 4.

Figure 2:
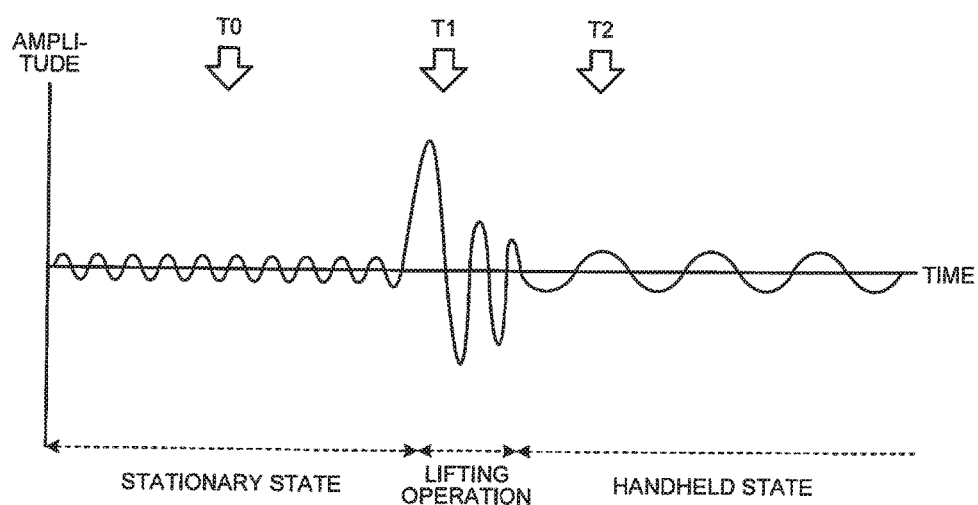
FIG. 2 is a diagram of an example of the timing of notification through a notification function.

With reference to FIG. 2, the following describes the notification through the notification function. FIG. 2 is a diagram of an example of the timing of the notification through the notification function. In FIG. 2, the horizontal axis indicates time, whereas the vertical axis indicates the magnitude of acceleration detected by the acceleration sensor of the motion detector 6 as amplitude.

At a timing T0 determined to be a stationary state, the mobile electronic device 1 detects the occurrence of an event to be notified and notifies the user of the occurrence of the event. The stationary state includes a state in which the mobile electronic device 1 is left at rest at a stable place.

The mobile electronic device 1 can determine the state of the mobile electronic device 1 based on the acceleration that the acceleration sensor of the motion detector 6 detects, for example. The mobile electronic device 1 determines that the mobile electronic device 1 is in the stationary state when the fluctuations of the magnitude of the acceleration that the acceleration sensor of the motion detector 6 detects are within a minute range, for example. The minute range is the range of fluctuations caused by a noise component contained in the output of the acceleration sensor, for example.

Even if notifying the occurrence of the event at the timing T0, when not detecting a corresponding response operation, the mobile electronic device 1 renotifies the user of the event as an unconfirmed event. After detecting that the state of the device is the stationary state, the mobile electronic device 1 renotifies the user of the unconfirmed event at a timing when detecting the state of being held by the hand of the user. The state of being held by the hand of the user includes a lifting operation and a handheld state. The lifting operation is an operation by the user to lift the device, for example. The handheld state is a state in which the user is holding the device with the hand, for example. In other words, the timing at which the mobile electronic device 1 renotifies the user of the unconfirmed event includes a timing T1 and a timing T2 illustrated in FIG. 2, for example. The timing T1 is a timing at which the mobile electronic device 1 has detected the lifting operation. The timing T2 is a timing at which the mobile electronic device 1 has detected the handheld state. In other words, the timing T2 is a timing at which the mobile electronic device 1 has detected that the state of the device has made a transition from the stationary state to the handheld state. The mobile electronic device 1 can renotify the user of the unconfirmed event at the timing T1 at which the lifting operation has been detected after detecting the stationary state. The mobile electronic device 1 can renotify the user of the unconfirmed event at the timing T2 at which the transition from the stationary state to the handheld state has been detected. When the unconfirmed event has been renotified but any operation responding to the notification has not been detected, the mobile electronic device 1 can notify the user of the unconfirmed event for the third time at a timing when again detecting that the state of the mobile electronic device 1 has made a transition from the stationary state to the state of being held by the hand of the user.

The mobile electronic device 1 can detect the lifting operation based on the acceleration that the acceleration sensor of the motion detector 6 detects, for example. The mobile electronic device 1 can determine that the lifting operation has been performed when the acceleration sensor of the mobile electronic device 1 in the stationary state or a state close thereto has detected a sudden, large change in acceleration, for example.

The mobile electronic device 1 can determine the handheld state based on the acceleration that the acceleration sensor of the motion detector 6 detects, for example. The mobile electronic device 1 can determine that the mobile electronic device 1 is in the handheld state when the fluctuation pattern of the acceleration that the acceleration sensor detects matches a vibration pattern caused by the natural shaking of a hand, for example. When the state of the mobile electronic device 1 has changed from a state other than the handheld state such as the stationary state to the handheld state, the mobile electronic device 1 can detect the transition to the handheld state.

FIG. 2 describes an example in which the mobile electronic device 1 detects that the state of the mobile electronic device 1 has made a transition to the state of being held by the hand of the user based on the fluctuation pattern of the acceleration that the acceleration sensor of the motion detector 6 detects. However, the mobile electronic device 1 may detect the transition of the state of the mobile electronic device 1 in place of the acceleration sensor or using another sensor in addition to the acceleration sensor. The mobile electronic device 1 may detect the transition of the state of the mobile electronic device 1 based on a change in angular velocity that the gyroscope detects, a change in bearing that the bearing sensor detects, a change in atmospheric pressure that the atmospheric pressure sensor detects, or the like, for example.

The mobile electronic device 1 may determine that the state of the mobile electronic device 1 has made a transition to the state of being held by the hand of the user when detecting an operation by the user to grasp the mobile electronic device 1. The operation by the user to grasp the mobile electronic device 1 can be detected using a touch sensor, a proximity sensor, a camera, or the like, for example.

The mobile electronic device 1 may execute the renotification of the unconfirmed event when the state of the mobile electronic device 1 has made a transition from a state other than the stationary state to the state of being held by the hand of the user. The state other than the stationary state includes a state in which the mobile electronic device 1 is put in a clothes pocket or a bag of the user, for example.

With reference to FIG. 3 and FIG. 4, the following describes the operation of the mobile electronic device 1 in more detail. FIG. 3 is a flowchart of an example of an operation about the notification function of the mobile electronic device 1. The operation illustrated in FIG. 3 is implementing by causing the controller 10 of the mobile electronic device 1 to execute the notification program 21.

As illustrated in FIG. 3, when an event to be notified occurs at Step S101, the controller 10 notifies the user of the occurrence of the event at Step S102. After that, the controller 10 determines whether any response operation corresponding to the notification has been detected at Step S103. When the response operation has been detected (Yes at Step S103), the controller 10 ends the operation illustrated in FIG. 3.

When the response operation has not been detected (No at Step S103), the controller 10 proceeds to Step S104. The controller 10 determines whether a lifting operation has been detected at Step S104. When the lifting operation has not been detected (No at Step S104), the controller 10 reexecutes the determination at Step S104. When the lifting operation has been detected (Yes at Step S104), the controller 10 proceeds to Step S105. The controller 10 notifies (renotifies) the user of the occurrence of the event at Step S105. The controller 10 then ends the operation illustrated in FIG. 3.

Although FIG. 3 illustrates an example in which the controller 10 performs the renotification at the timing at which the lifting operation has been detected, the controller 10 may perform the renotification when the transition to the handheld state has been detected. FIG. 4 is a flowchart of another example of the operation about the notification function of the mobile electronic device 1. The operation illustrated in FIG. 4 is implemented by causing the controller 10 of the mobile electronic device 1 to execute the notification program 21.

As illustrated in FIG. 4, when an event to be notified occurs at Step S201, the controller 10 notifies the user of the occurrence of the event at Step S202. After that, the controller 10 determines whether any response operation corresponding to the notification has been detected at Step S203. When the response operation has been detected (Yes at Step S203), the controller 10 ends the operation illustrated in FIG. 4.

When the response operation has not been detected (No at Step S203), the controller 10 proceeds to Step S204. The controller 10 determines whether a transition to the handheld state has been detected at Step S204. When the transition to the handheld state has not been detected (No at Step S204), the controller 10 reexecutes the determination at Step S204. When the transition to the handheld state has been detected (Yes at Step S204), the controller 10 proceeds to Step S205. The controller 10 renotifies the user of the occurrence of the event at Step S205. The controller 10 then ends the operation illustrated in FIG. 4.

Embodiments that the present application discloses can be modified without departing from the essence and the scope of the invention. Further, embodiments and modifications thereof that the present application discloses can be appropriately combined.

The computer program illustrated in FIG. 1 may be divided into a plurality of modules or combined with another computer program, for example.

In order to disclose the techniques according to the accompanying claims completely and clearly, characteristic embodiments have been described. However, the accompanying claims should not be limited to embodiments and should be configured to embody all modifications and alternative configurations that those skilled in the art can create within the scope of the basic matters disclosed in the present specification.

The invention claimed is:
1. A mobile electronic device, comprising:
a motion detector configured to detect motion of the mobile electronic device;
an annunciator configured to perform notification about an event; and
a controller configured to control the annunciator to perform the notification about the event, wherein
the controller is configured to detect, based on a first condition of a detected value detected by the motion detector, a lifting operation that lifts the mobile electronic device,
the controller is configured to detect, based on a second condition of the detected value, a transition of the mobile electronic device to a handheld state, wherein the second condition is different from the first condition, and the controller is configured to control the annunciator to perform the notification about the event in response to a detection of the second condition after occurrence of the first condition.

2. The mobile electronic device according to claim 1, wherein the controller is configured to control the annunciator to perform notification about event again for which an operation responding to the notification has not been detected although having been notified by the annunciator when the lifting operation has been detected.

3. The mobile electronic device according to claim 1, wherein the controller is configured to control the annunciator to perform notification through sound or vibration when the lifting operation has been detected.

4. A control method for a mobile electronic device, the control method comprising:
   detecting, by a motion detector of the mobile electronic device, motion of the mobile electronic device;
   detecting, based on a first condition of a detected value detected by the motion detector, a lifting operation that lifts the mobile electronic device;
   detecting, based on a second condition of the detected value, a transition of the mobile electronic device to a handheld state, wherein the second condition is different from the first condition; and
   performing notification about an event in response to a detection of the second condition after occurrence of the first condition.

5. The mobile electronic device according to claim 1, wherein the annunciator is configured to generate sound to perform the notification about the event.

6. The mobile electronic device according to claim 1, wherein the annunciator is configured to generate light to perform the notification about the event.

7. The mobile electronic device according to claim 1, wherein the annunciator is configured to generate vibration to perform the notification about the event.

8. The mobile electronic device according to claim 2, wherein a manner of notification in which the annunciator performs the notification about the event again is different from a manner of notification in which the annunciator performs the notification about the event when the event occurs.

9. The mobile electronic device according to claim 2, wherein the controller is configured to control the annunciator to perform the notification about the event again in response to a transition of the mobile electronic device from a state other than a stationary state to the handheld state.

10. A mobile electronic device, comprising:
    a motion detector configured to detect motion of the mobile electronic device;
    an annunciator configured to perform notification; and
    a controller configured to
       detect, based on a first condition of the detected value detected by the motion detector, a lifting operation that lifts the mobile electronic device, and
       detect, based on a second condition of the detected value detected by the motion detector, a handheld state of the mobile electronic device, wherein the second condition is different from the first condition,
    wherein the controller is configured to control the annunciator to
       perform a notification about an event in response to an occurrence of the event,
       after the notification about the event has been performed but an operation responding to the notification has not been detected, perform a first re-notification about the event in response to a detection of the lifting operation, and
       after the first re-notification about the event has been performed but an operation responding to the first re-notification has not been detected, perform a second re-notification about the event in response to a detection of the handheld state after the detection of the lifting operation.

11. The mobile electronic device according to claim 10, wherein a manner of notification in which the annunciator performs the first or second re-notification is different from a manner of notification in which the annunciator performs the notification.

12. The mobile electronic device according to claim 10, wherein the controller is further configured to
    detect, based on a third condition of the detected value detected by the motion detector, a stationary state of the mobile electronic device, wherein the third condition is different from the first and second conditions, and
    after the notification about the event has been performed but an operation responding to the notification has not been detected, control the annunciator to perform a re-notification about the event in response to a detection of a transition of the mobile electronic device from a state other than the stationary state to the handheld state.

* * * * *